United States Patent
Engfer

[15] 3,666,286
[45] May 30, 1972

[54] AUTOMATIC LEVELLING ARRANGEMENT FOR VEHICLES

[72] Inventor: Ortwin Engfer, Gerlingen, Germany
[73] Assignee: Robert Bosch GmbH, Stuttgart, Germany
[22] Filed: Aug. 19, 1970
[21] Appl. No.: 65,091

[30] Foreign Application Priority Data

Aug. 23, 1969   Germany .................... P 19 44 178.2
Apr. 9, 1970    Germany .................... P 20 16 963.5

[52] U.S. Cl. .......................................... 280/124 F, 207/65 D
[51] Int. Cl. .................................................... B60g 17/04
[58] Field of Search .......................... 280/124 F, 6 H

[56] References Cited

UNITED STATES PATENTS 3,061,330  10/1962  Alfieri ............................. 280/124 F
3,124,368   3/1964  Corley ........................... 280/124 F X Primary Examiner—Philip Goodman
Attorney—Michael S. Striker

[57] ABSTRACT

Switching arrangements, either mechanical or electrical, are controlled by the vehicle body level to cause operation of means, such as electromagnetically operated valves, for supplying fluid to, or withdrawing fluid from, fluid pressure leveler, in dependence on whether the body falls below, or rises above, the desired level. The switches for one leveler of an axle are connected to the switches of the other leveler of the same axle.

13 Claims, 10 Drawing Figures

AUTOMATIC LEVELLING ARRANGEMENT FOR VEHICLES

BACKGROUND OF THE INVENTION

The invention relates to levelling arrangements for an axle of a vehicle.

Known levelling arrangements, such as the arrangement described in the French patent 1,350,000, comprise two independent fluid pressure levelers, and means for supplying hydraulic fluid to the levelers, and valve means for permitting fluid to be discharged from the levelers. The French arrangement further comprises means responsive to the vehicle level and incorporating interconnected electrical switches.

In this known arrangement, the switches are so arranged that the vehicle body is raised or lowered only if the switches for both sides of the vehicle are operated. This scheme avoids operation of the levelling arrangement when the vehicle body tips while rounding a curve. This construction has, however, the disadvantage that it is not automatically possible to add fluid to, or remove fluid from, a single leveler. Moreover, this known arrangement either cannot be used with levelers having built-in valves and motors, or else it is not suitable for use with such levelers. Finally, since the two levers on the left and right sides of a common axle are connected together by a single pneumatic line, rolling stability is poor.

SUMMARY OF THE INVENTION

An object of the invention is levelling arrangements of the general kind previously described, which levelling arrangements are not operated when rounding curves, but which, however, permit independent charging and discharging of the fluid pressure levelers of the same axle, and which ensure improved rolling stability in S-curves and avoid pitching and rolling.

The invention consists essentially of at least two independent fluid pressure levelers, one for each wheel unit, electrically controlled supply means and electrically controlled discharge means for each of the levelers, whereby the body can be raised and lowered to regulate the level thereof in response to loads, a first switch pair for one of the levelers and a second switch pair for the other of the levelers, the first switch pair having first and second switch means respectively connected to the supply means and the discharge means of the one leveler, and the second switch pair comprising third and fourth switch means respectively connected to the supply means and the discharge means of the other leveler, the first and third switch means being operated when the body level decreases and the second and fourth switch means being operated when the body level increases, a current source for the supply means and discharge means connected to the first and second switch pair, whereby the switch means thereof respectively control current flow to the supply means and the discharge means, and conductor means for so electrically interconnecting the first and second switch pair that current from the current source for the supply means of the one leveler can flow only when the discharge means of the other leveler are inactive and current from the current source for the supply means of the other leveler can flow only when the discharge means of the one leveler are inactive.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
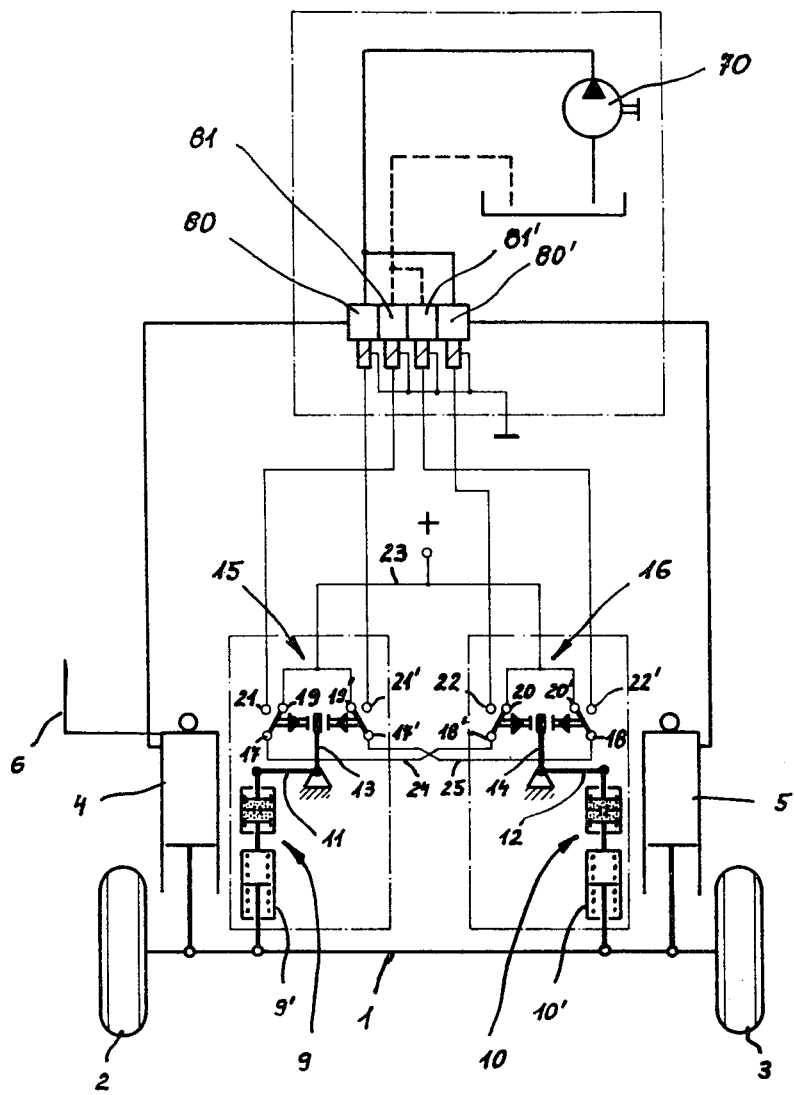
FIG. 1 schematically shows a first embodiment of the invention.

With reference to FIG. 1, the motor vehicle has an axle 1 with two wheels 2 and 3, which support the vehicle body 6 through respective fluid pressure levelers 4 and 5. A pump 70 supplies fluid to the shock absorbers through respective electromagnetic valves 80 and 80'. Respective electromagnetic relief valves 81 and 81' permit fluid to flow from the shock absorbers 4 and 5. A single pump 70 is provided for the two shock absorbers. In the case of a four-wheel vehicle, all four shock absorbers are supplied with fluid by a single pump. There is arranged on the axle 1 and parallel to each leveler 4 and 5 a hydraulic damping arrangement 9 and 10, which comprises a respective steel spring 9' and 10'. Pivotally attached to each damper 9 and 10 is a respective angle lever 11 and 12 of which the vertical arm 13 and 14 serves as the control arm for a respective double switch arrangement 15 and 16. Each switch arrangement 15 and 16 has two common contacts 17, 17' or 18, 18'. Moreover, each switch arrangement has an inner, rest, contact 19, 19' or 20, 20' and an outer, make contact, 21, 21' or 22, 22'.

An electrical conductor 23 connects the rest contact 19, 19' and 20, 20' to the positive pole of a current source. The make contact 21 is connected to the relief valve 81, and the make contact 21' is connected to the relief valve 80 of the left leveler 4. The make contact 21 and 21' are respectively connected to the relief valve 81 and the supply valve 80 of the left leveler 4. The make contacts 22' and 22 are respectively connected to the relief valve 81' and the supply valve 80' of the right shock absorber 5. The common contact 17 of the left switch arrangement 15 is cross-connected by a conductor 24 to the common contact 18' of the right switch arrangement 16, and the common contact 17' of the left switch arrangement 15 is cross-connected by a conductor 25 to the common contact 18 of the right switch arrangement 16. By so interconnecting the two switch arrangements, the current for the supply valve 80 of the left leveler flows through the switch arrangement 16 of the right leveler, and the current for the supply valve 80' of the right leveler 5 flows through the switch arrangement 15 of the left leveler 4.

The level regulator just described operates in the following manner. When the vehicle body 6 is in its neutral position all the parts of the regulator are in the positions shown in FIG. 1. If the axle 1 is loaded on both wheels, the arms 13 and 14 are moved inwards, and the common contacts 17' and 18' are respectively connected to the make contacts 21' and 22'. Current can now flow through the conductor 23, the contacts 19 and 17, the conductor 24, and the contacts 18' and 22 to the supply valve 80 of the right leveler. Simultaneously, current flows through the other conductor 25 to the supply valve 80' of the left leveler. The electrical pump 70 supplies fluid to both levelers until the vehicle body has been raised to its original level. The pump 70 can also be driven by the vehicle engine, or driven hydraulically by the vehicle wheels, or by vacuum of the intake manifold of the engine. Once the vehicle body is raised to its original level, the two switch arrangements 15 and 16 are again in their original positions, so that the current path to the electromagnetic supply valves 80 and 80' is broken.

If the axle 1 is relieved of its load, the vehicle body 6 rises, and the arms 13 and 14 pivot outwards. Consequently, the common contacts 17 and 18 are connected to the respective make contacts 21 and 22'. Current flows through the conductor 23, the contacts 19' and 17', the conductor 25, and the contacts 18 and 22' to the relief valve 81' of the right leveler 5. Current also flows through the contacts 20 and 18', the conductor 24, as well as the contacts 17 and 21 to the relief valve 81 of the left leveler 4. The relief valves 81 and 81' open and permit fluid to discharge from the levelers, thereby permitting the vehicle body 6 to fall to its original level.

If the vehicle body 6 tips leftwards, for example, when rounding a curve, the arm 13 of the angle lever 11 is caused by the damper 9 to pivot to the right, and the common contact 17' is connected to the make contact 21'. The consequence of this is that no current can flow to the supply valve of the left leveler 4, because the arm 14 also pivots to the right and connects contact 18 to contact 22'. There is, therefore, no regulation of the level. The same is true when the vehicle body 6 tips to the right.

Figure 2:
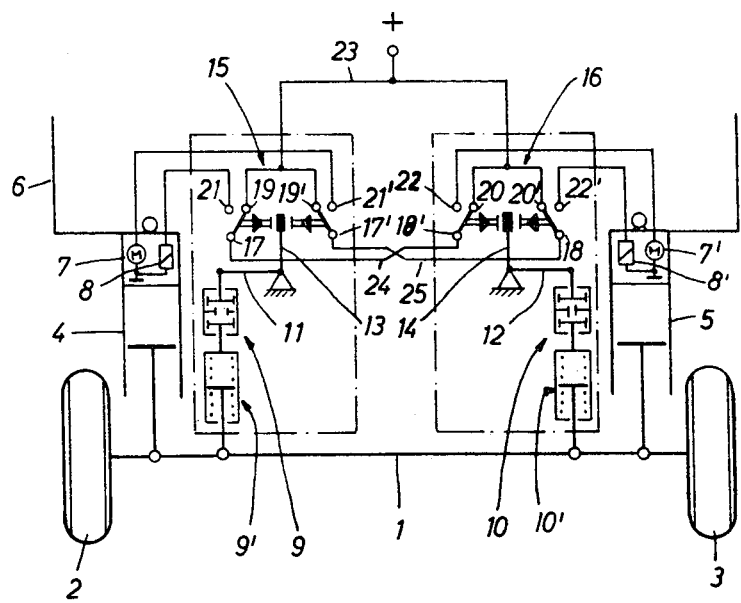
FIG. 2 schematically shows a second embodiment of the invention.

FIG. 2 shows a second embodiment having a separate pump arrangement for each leveler. Those parts in this embodiment that correspond to parts in the embodiment shown in FIG. 1 are denoted by the same reference numerals. The vehicle axle 1 has two wheels 2 and 3, which support a vehicle body 6 through respective levelers 4 and 5. Each leveler 4 and 5 has a built-in pump arrangement 7 and 7' and a discharge valve 8 and 8'. The pump arrangements 7 and 7' are each an electric motor, and the discharge valves 8 and 8' are each electromagnetically operated.

The make contacts 21 and 21' are respectively connected to the discharge valve 8 and the electric motor 7 of the left leveler 4. The make contacts 22' and 22 are respectively connected to the discharge valve 8' and the electric motor 7 of the right leveler 5. The common contact 17 of the left switch arrangement 15 is cross-connected by a conductor 24 to the common contact 18' of the right switch arrangement 16, and the common contact 17' of the left switch arrangement 15 is cross-connected by a conductor 25 to the common contact 18 of the right switch arrangement 16. By so cross-connecting, the current for the motor 7 of the left leveler 4 is conducted through the switch arrangement 16 of the right leveler 5, and the current for the motor 7' of the right leveler 5 is conducted through the switch arrangement 15 of the left leveler 4.

This embodiment of the invention operates in the following manner. When the vehicle body is in its neutral position all parts take the positions shown in FIG. 2. If the axle 1 is loaded on both wheels, the arms 13 and 14 are pivoted inwardly, and the common contacts 17' and 18' are respectively connected to the make contacts 21' and 22. Current can flow through the conductor 23, the contacts 19 and 17, the conductor 24, and the contacts 18' and 22 to the motor 7 of the right leveler. At the same time, current flows through the conductor 25 to the motor 7' of the left levelers. Both levelers are supplied with hydraulic fluid until the vehicle body 6 is returned to its original level. When this is true, the switch arrangements 15 and 16 are once again in the positions shown in FIG. 2, so that the described current paths are broken, and the electric motors 7 and 7' are switched out of the circuit.

If the axle 1 is relieved of its load, the body 6 rises, and the arms 13 and 14 pivot outwards. Consequently, the common contacts 17 and 18 are respectively connected to the make contacts 21 and 22'. Current flows through the conductor 23, the contacts 19' and 17', the conductor 25, and the contacts 18 and 22' to the discharge valve 8' of the right leveler 5. Current also flows through contacts 20 and 18', the conductor 14' and the contacts 17 and 21 to the discharge valve 8 of the left leveler 4. The two valves 8 and 8' open and permit hydraulic fluid to discharge from the levelers, so that the body 6 falls to its original level.

If the vehicle body 6 tips, for example, to the left when rounding a curve, the arm 13 of the angle lever 11 is pivoted by the damper 9 to the right, and the common contact 17' is connected to the make contact 21'. Since, however, at the same time the arm 14 is pivoted to the right, common contact 18 is connected to the make contact 22', and there is no adjustment of the body level. The same is also true when the vehicle body tips to the right.

Figure 3:
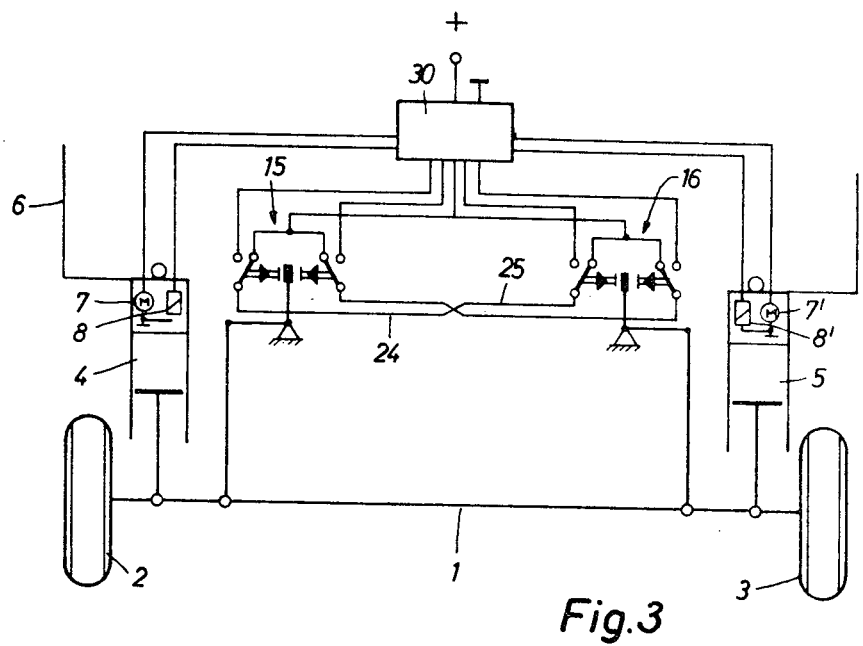
FIGS. 3, 4, 5 and 6 schematically show each a further embodiment of the invention.
Figure 7:
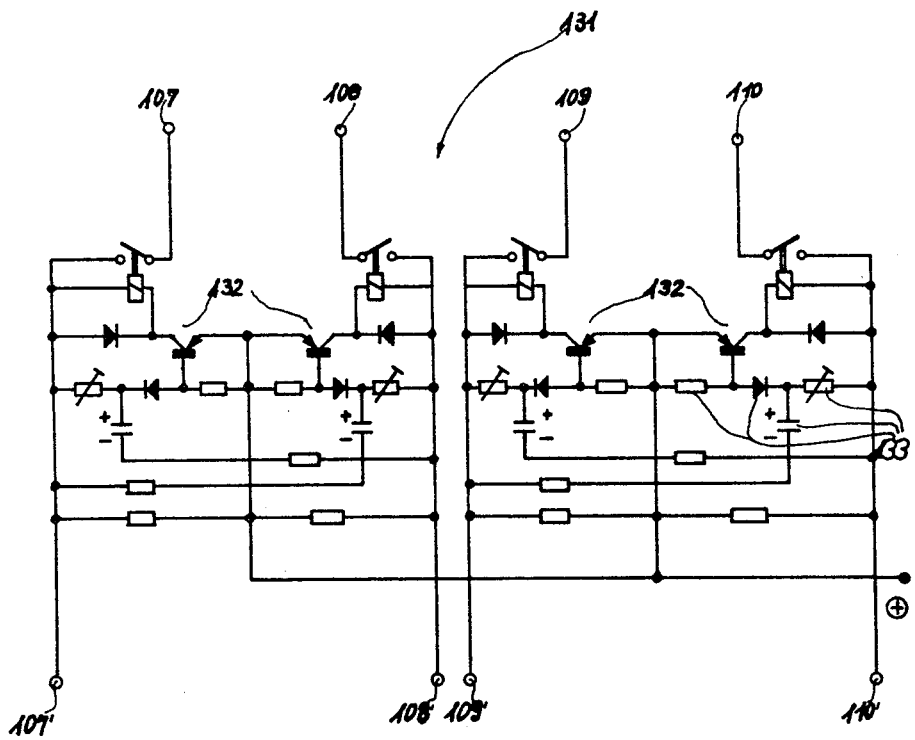
FIG. 7 is a circuit diagram showing an electronic damping unit as used in certain of the embodiments of the invention.

If the two dampers 9 and 10 have different damping time constants, it is possible, when rounding a curve, that the level arrangement of the invention is operated when, in fact, it should not be. To avoid undesired operation of the levelling arrangement, the hydraulic dampers 9 and 10, in the embodiment of FIG. 3, are replaced by an electronic damping unit 30, which has exactly the same damping time constant for each of the levelers. The details of the electronic damping unit are shown in FIG. 7.

Figure 4:
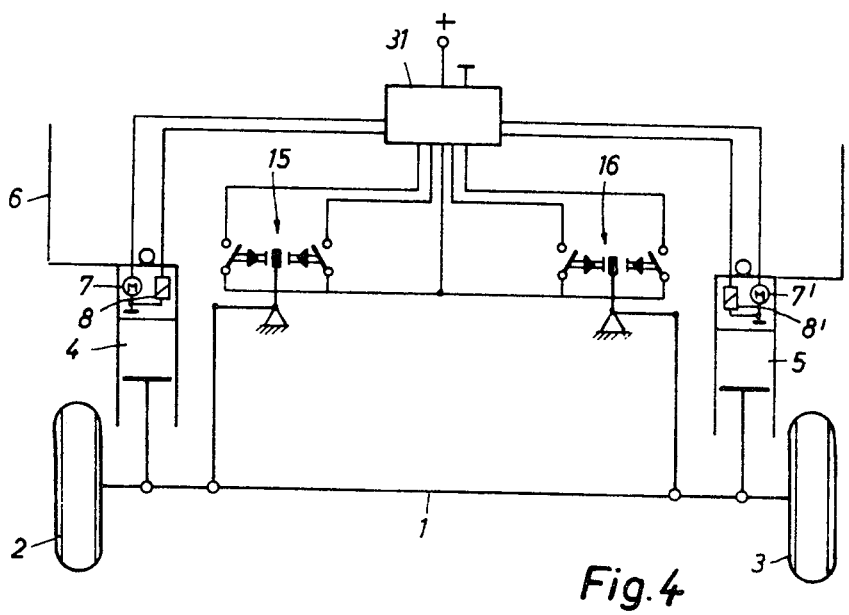
Figure 5:
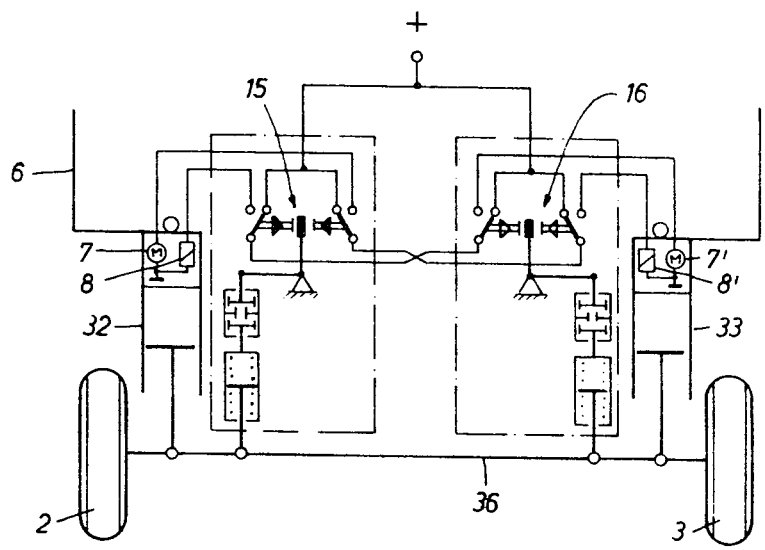
Figure 5:
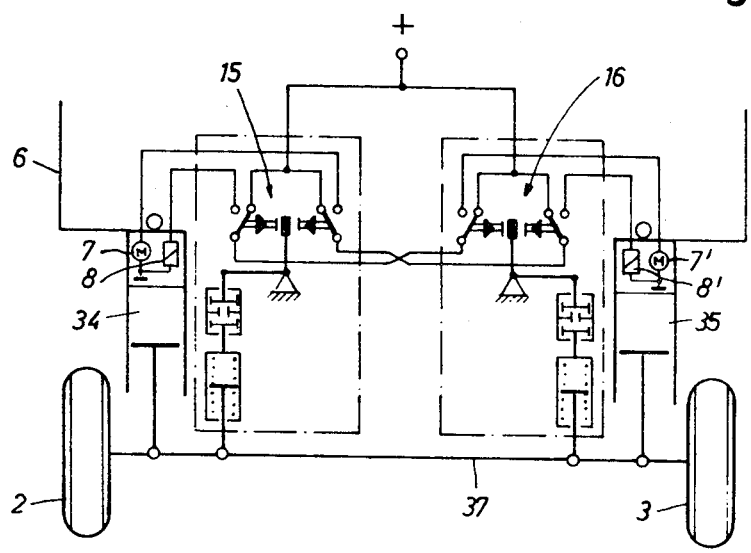

In the embodiment shown in FIGS. 3-5 the same reference numerals are used as in the embodiment shown in FIG. 1.

In the embodiment shown in FIG. 4, the cross-connecting conductors 24 and 25 are replaced by an electronic unit 31, which not only provides the necessary connections but also accomplishes the damping. In this embodiment it is possible to use simple switches or inductive level sensors that can be built into the levelers. The details of the connections are shown in the circuit 61 of FIG. 9. The unit 31, shown as a box in FIG. 4, comprises the electronic damping unit 30 and the circuit 61, which latter is connected between the unit 30 and the switches 15 and 16. When using inductive level sensors in this embodiment, it is possible so to control these sensors that the desired level of the vehicle body 6 above the road surface is continuously variable, as more fully explained in connection with the explanation of the embodiment shown in FIG. 10. The cross-connections accomplished by the logic circuit 61 shown in FIG. 9 prevent, as in the previous embodiment, any level regulation while rounding a curve.

In all of the embodiments, all of the fluid pressure levelers of one axle are completely separated from one another up to the electrical connections. This arrangement ensures a greatly improved rolling stability, and special means for stabilizing the vehicle against rolling can be discarded, because the same conditions obtain with separate levelers as in a vehicle with unregulated springing.

Moreover, in those embodiments in which a separate electric motor and electromagnetic relief valve are built into each leveler, the entire unit, consisting of the leveler and the valve and the motor, can be incorporated in the vehicle at any time after the latter is constructed, with a view to provide the vehicle with hydraulic springing. It is only necessary, then, to make the electrical connections, which is more simply done than to install hydraulic lines.

Figure 6:
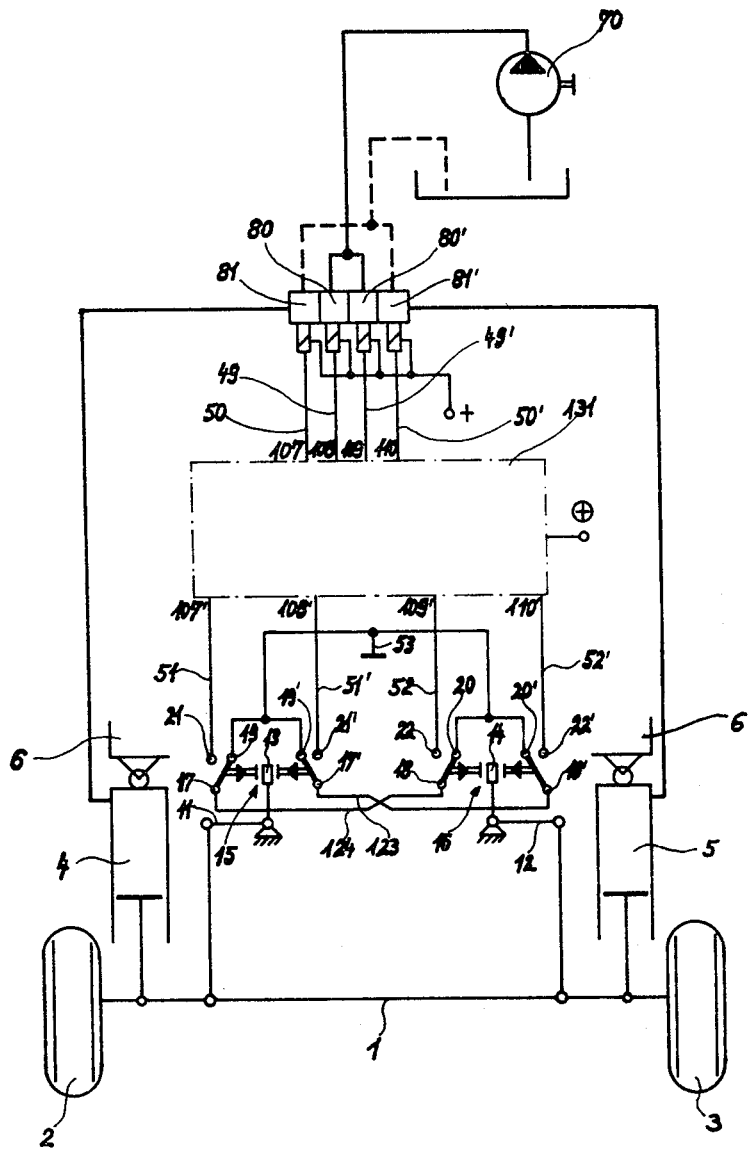

In the embodiment shown in FIG. 6, those parts that are common to this embodiment and that shown in FIG. 1 are denoted by the same reference numerals. The four electromagnetic valves 80, 80', 81 and 81' are connected by respective electrical conductors 49, 50, 49' and 50' to respective terminals 107, 108, 109 and 110 of the electronic damping unit 30, shown in FIG. 7. Pivotally mounted on the vehicle axle 1, near to a respective wheel 2 and 3, is an angle lever 11 and 12, the respective arms 13 and 14 of which operate the switch arrangements 15 and 16. Each switch arrangement has two common contacts 17, 17' or 18, 18'. Each of the switch arrangements also has two inner rest contacts 19 and 19' or 20 and 20' and two outer work contacts 21 and 21' or 22 and 22'.

The conductors 51, 51', 52 and 52' connect the switch arrangement 15 and 16 to the respective terminals 107', 108', 109' and 110' of the electronic damping unit 30. The conductors 123 and 124 cross-connect the two switch arrangements 15 and 16. The arms 13 and 14, caused to pivot by the changes in height of the vehicle body 6, operate the respective switch arrangements 15 and 16. The operation of these two switch arrangements, in turn, controls the electronic damping unit 30.

As shown in FIG. 7, the unit 30 comprises active electronic components 132 and passive components 133. Exactly equal damping times are ensured by the four trimmers 133' the resistance values of which can be varied to compensate for any differences in the reaction times of the components of the unit 30. The unit 30 so enables varying the damping on the two sides of the vehicle that absolutely equal damping times are obtained. The unit 30 only acts as a damper, the cross-connections between the switching arrangements 15 and 16 being effected by the conductors 123 and 124 in conjunction with the contacts 17, 19, 17', 19' and 18, 20, 18', and 20'.

Figure 8:
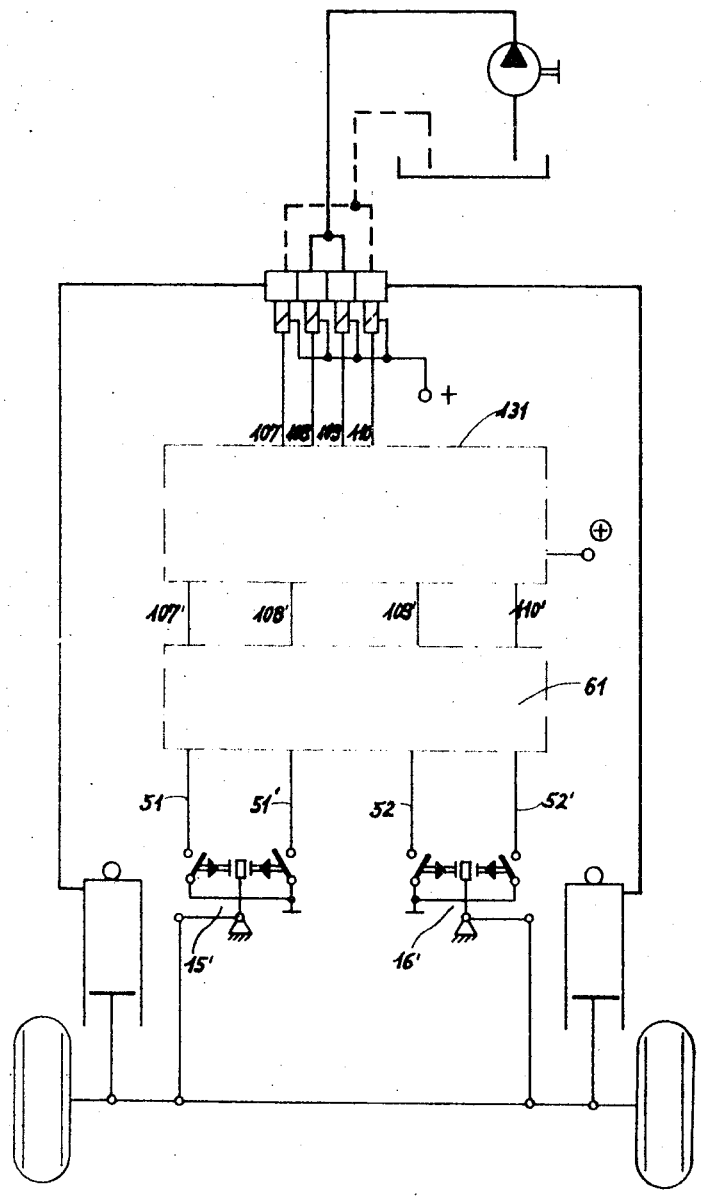
FIGS. 8 and 10 schematically show two further embodiments of the invention.

The embodiment shown in FIG. 8 has a particularly simple mechanical switch arrangement 15' and 16'. Those parts in this embodiment corresponding to the parts in the embodiment shown in FIG. 1 are denoted by the same reference numerals.

Figure 9:
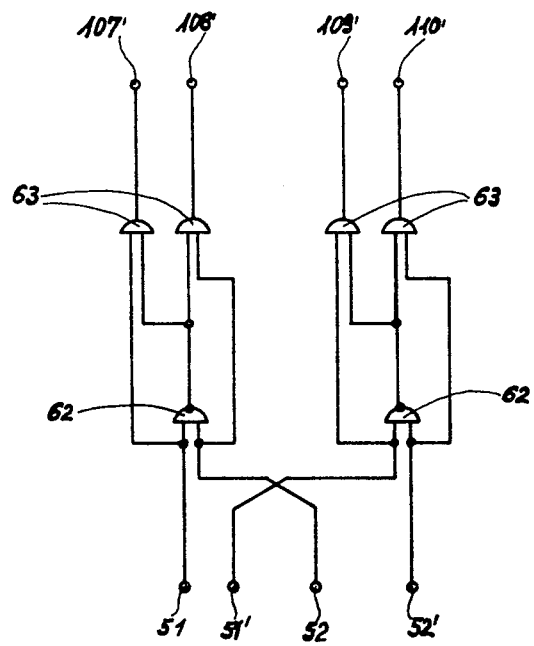
FIG. 9 shows a logic circuit used in the embodiments of FIGS. 8 and 10.

Each of the switch arrangements 15' and 16' has two make contacts and no rest contacts. A logic circuit, shown in FIG. 9, is connected between the electronic damping unit 30, shown in FIG. 7, and the conductors 51, 51', 52, 52' leading to the switch arrangements 15' and 16'. The logic circuit, which replaces the cross-connecting conductors 123 and 124 of the embodiment shown in FIG. 6, comprises two NAND gates 62 and 62' and four AND gates 63 and 63'. These gates consist of known arrangements of resistors and semiconductor components. The inputs to these gates are denoted by E1 and E2 and the outputs by the letter A.

For the NAND gates the following table obtains:

| E1 | E2 | A |
|----|----|----|
| 0  | 0  | 1 |
| 0  | 1  | 1 |
| 1  | 0  | 1 |
| 1  | 1  | 0 |

In other words, when both inputs are conductive there is no output.

For the AND gates the following table obtains

| E1 | E2 | A |
|----|----|----|
| 0  | 0  | 0 |
| 0  | 1  | 0 |
| 1  | 0  | 0 |
| 1  | 1  | 1 |

In other words, when both inputs are conductive the output is also conductive.

As is clear from the circuit shown in FIG. 9, the logic circuit replaces the cross-connecting conductors 24 and 25 or 123 and 124.

Figure 10:
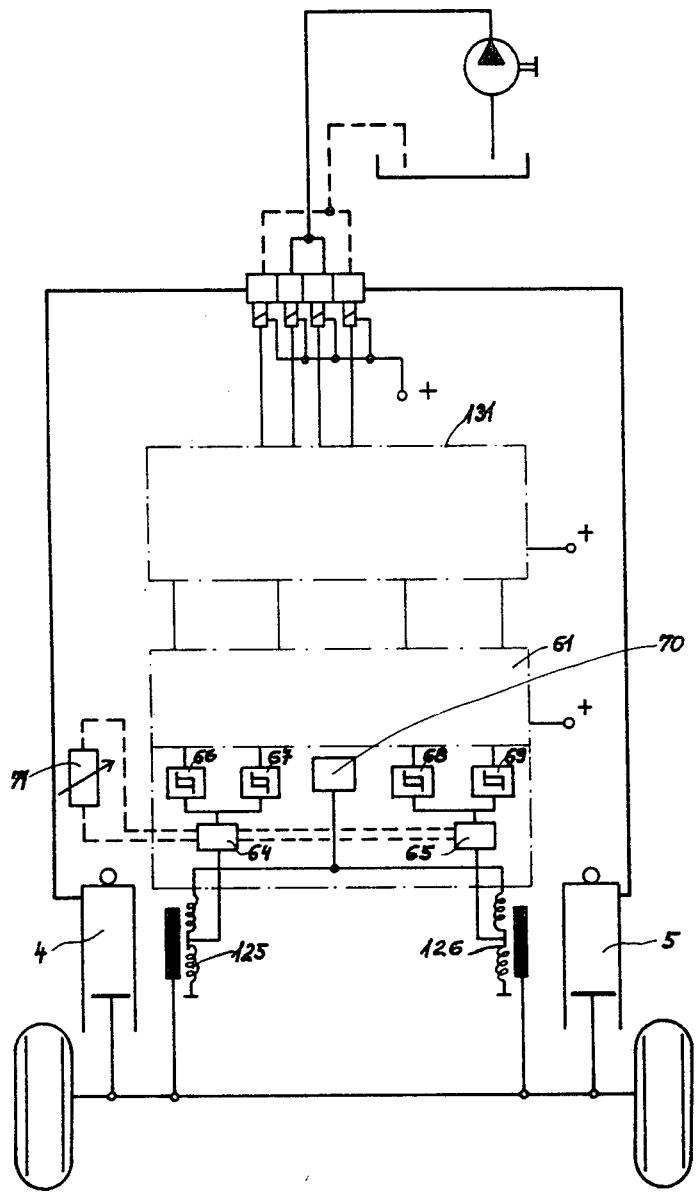

The last embodiment, shown in FIG. 10, comprises two inductive level sensors 125 and 126. Those parts in this embodiment that correspond to the parts in the embodiment shown in FIG. 10 are denoted by the same reference numerals. Connected between the unit 61 and each of the inductive level sensors 125 and 126 is a respective rectifier 64 and 65 and a pair of Schmitt triggers 66, 67 and 68, 69. A Schmitt trigger is a device of which the output can correspond to one of two different states. The output is switched from one state to the other when the input voltage exceeds a predetermined value. As in the embodiment shown in FIG. 8, the logic circuit 61 takes the place of the cross-connected conductors 123 and 124 of the switches 15 and 16.

Corresponding ends of the inductive level sensers 125 and 126 are connected to ground and to a frequency generator 70. The rectifiers 64 and 65 are both connected to a resistor 71, which is arranged in the vehicle so that it is easily adjusted at all times. Setting the resistor 71 enables continuous adjustment of the desired level of the vehicle body 6 above the road surface.

The embodiment just described operates in the following manner. The generator 70 supplies a frequency to the coils 125 and 126. The position of the core, which is shown as a solid black bar, with respect to the position of a coil determines the inductive reactance of the coil. Since the cores are attached to the wheel axle, they remain stationary, whereas the coils move up and down with the vehicle body thereby changing the coil inductance. The center tap on each coil is connected to a respective rectifier 64 and 65, the output of which is directly proportional to the instantaneous position of the core. The output of each rectifier is connected to the input of a respective pair of Schmitt triggers 66, 67 and 68, 69. Trigger 67 is connected to the input E1 of NAND gate 62', trigger 66 is connected to the input E1 of NAND gate 62, and so forth. When trigger 67 renders conductive the input E1 of 62', trigger 68 renders conductive the input E2 of NAND gate 62, for example. Consequently, a current path is formed from the output of rectifier 64, through the trigger 67, the gates 62' and 63' (left) to the coil of the relay associated with the line between the terminals 108 and 108'. The transistor connected to this coil is turned on, the relay is energized and closed, and a current path is completed between the output of the rectifier 64 and the supply valve 80 for the left wheel. The current output of this rectifier operates the electromagnetic valve 80.

It will be understood that each of the elements described above, or two or more together, may also find a useful application in other types of constructions differing from the types described above.

While the invention has been illustrated and described as embodied in an automatic levelling arrangement for vehicles, it is not intended to be limited to the details shown, since various modifications and structural changes may be made without departing in any way from the spirit of the present invention.

Without further analysis, the foregoing will be so fully reveal the gist of the present invention that others can by applying current knowledge readily adapt if for various applications without omitting features that from the standpoint of prior art fairly constitute essential characteristics of the generic or specific aspects of thie invention and, therefore, such adaptations should and are intended to be comprehended within the meaning and range of equivalence of the following claims.

What is claimed as new and desired to be protected by Letters Patent is set forth in the appended

1. A level regulator for a vehicle having a body and at least coaxial wheel units, comprising, in combination, at least two independent fluid pressure levelers, one for each wheel unit; electrically controlled supply means and electrically controlled discharge means for each of said levelers, whereby the body can be raised and lowered to regulate the level thereof in response to load; a first switch pair for one of said levelers and a second switch pair for the other of said levelers, said first switch pair having first and second switch means respectively connected to said supply means and said discharge means of said one leveler, and said second switch pair comprising third and fourth switch means respectively connected to said supply means and said discharge means of said other leveler, said first and third switch means being operated when the body level decreases and said second and fourth switch means being operated when the body level increases; a current source for said supply means and said discharge means connected to said first and second switch pair, whereby said switch means thereof respectively control current flow to said supply means and said discharge means; conductor means for so electrically interconnecting said first and second switch pair that current from said current source for said supply means of said one leveler can flow only when said discharge means of said other leveler are inactive and current from said current source for said supply means of said other leveler can flow only when the discharge means of said one leveler are inactive.

2. A level regulator as defined in claim 1, wherein said conductor means so electrically interconnects said first and second switch pair that current from said current source for said supply means of said one leveler flows through at least part of said fourth switch means and current from said current source for said supply means of said other leveler flows through at least part of said second switch means.

3. A level regulator as defined in claim 1, wherein said levelers are hydraulic, and including common pump means therefor, and respective electromagnetic valve means comprised by each said supply means.

4. A level regulator as defined in claim 3, including respective electromagnetic valve means comprised by each said discharge means.

5. A level regulator as defined in claim 1, wherein said levelers are hydraulic and each said discharge means comprise a respective electromagnetic valve means, and each said supply means comprise a respective electric motor pump means, and wherein said conductor means so electrically interconnects said first and second switch pair that current from said electric motor pump means of said one leveler flows through said fourth switch means and current for said electric motor pump means of said other leveler flows through said second switch means.

6. A level regulator as defined in claim 5, wherein each of said switch means comprise a common contact, a rest contact, and a make contact, and wherein said make contacts of said first and second switch means are respectively connected to said motor pump means and said valve means of said one leveler and said make contacts of said third and fourth switch means are respectively connected to said motor pump means and said valve means of said other leveler.

7. A level regulator as defined in claim 1, including electronic damping means comprising a plurality of transistors and connected between said switch means, on the one hand, and said supply means and said discharge means, on the other.

8. A level regulator as defined in claim 7, wherein said electric damping means include adjusting means for obtaining equal damping times for each said shock absorber.

9. A level regulator as defined in claim 7, wherein said switch means are electronic, and including logic circuit means comprising said switch means and connected to said electronic damping means.

10. A level regulator as defined in claim 7, wherein said switch means are mechanical, and said conductor means include logic circuit means for controlling the flow of current to said electronic damping means.

11. A level regulator as defined in claim 9, including inductive means for sensing the level of the vehicle body as a function of change in inductive reactance with change in vehicle body level.

12. A level regulator as defined in claim 11, including frequency generating means connected to said inductive means for producing an output from said inductive means in dependence on the inductive reactance thereof; rectifier means for rectifying the output of said inductive means; and Schmitt trigger means connected to be operated by the output of said rectifier means for controlling the operation of said logic circuit means.

13. A level regulator as defined in claim 12, including means connected to said rectifier means for continuously varying the desired level of a vehicle body above the road surface.

* * * * *